Dec. 13, 1966   E. J. JUSTUS   3,291,876
METHOD AND MECHANISM FOR BIAXIALLY ORIENTING
EXTRUDED TUBULAR FILM
Filed May 5, 1964
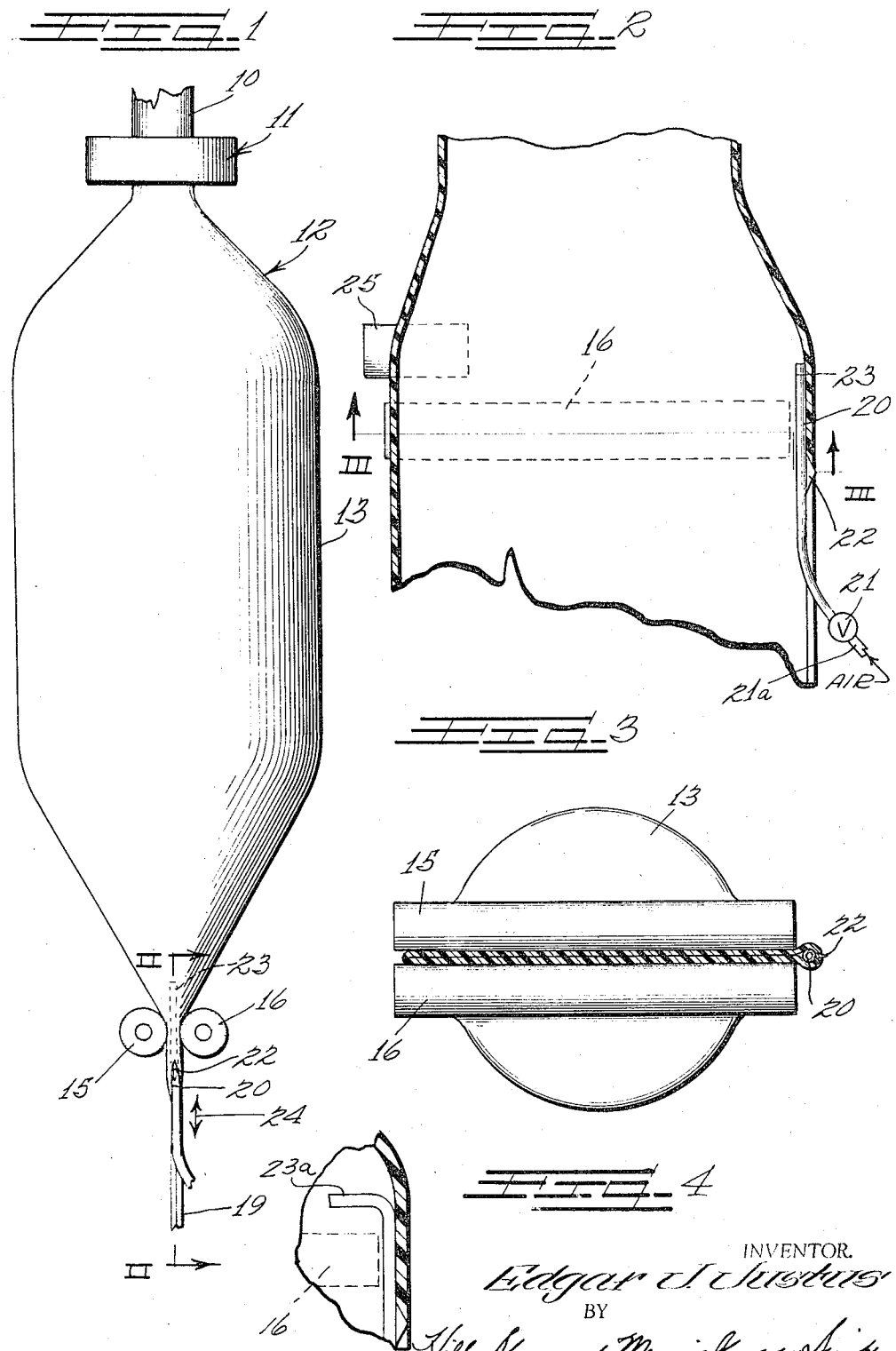
INVENTOR.
Edgar J. Justus
BY
ATTORNEYS

United States Patent Office 3,291,876
Patented Dec. 13, 1966

3,291,876
METHOD AND MECHANISM FOR BIAXIALLY ORIENTING EXTRUDED TUBULAR FILM
Edgar J. Justus, Beloit, Wis., assignor to Beloit Corporation, Beloit, Wis., a corporation of Wisconsin
Filed May 5, 1964, Ser. No. 365,023
7 Claims. (Cl. 264—95)

The invention relates to improvements in the manufacture of tubular film of thermoplastic material.

A commonly used method and apparatus for the production of thermoplastic film in tubular form involves forming an extrudate of material in a formative plastic state and extruding the material through an annular die to form a seamless tubing. The tubing is received from the die by a pair of squeeze or pinch rolls spaced from the point of extrusion, and as the tubing advances to the squeeze rolls and while it is in the formative plastic state it is inflated to a predetermined diameter by a gaseous medium introduced into the interior of the tubing to form a bubble. Axial orientation of the tubular film material is obtained by drawing the material forwardly by the pinch rolls and can be controlled by controlling the speed of rotation of the pinch rolls. Biaxial orientation is obtained and regulated by the inflation of the tubing to a predetermined diameter to form the bubble in the tube between the die and pinch rolls. The present invention is concerned with the control of the biaxial orientation of the film in an improved manner and with the control of the cooling of the film which begins as soon as the film leaves the die. Exterior cooling is maintained substantially constant due to the constant temperature of the ambient air and interior cooling is controlled by the temperature of the gaseous medium within the film.

It is an object of the present invention to provide an improved method for introducing a cooling gaseous medium into a section of continuous advancing length of tubular film under controlled conditions for accurately regulating the biaxial orientation of the film and for obtaining optimum and uniform cooling of the film.

A further object of the invention is to provide an improved method and apparatus for slitting the edge of the tube of film formed by the tubular extrusion process so as to obtain a sheet of film.

The invention contemplates providing a mechanism for extruding tubular plastic to an extrusion die with a pair of rotatable pinch rolls spaced from the die for drawing the tubular film forwardly from the die with a bubble formed between the die and pinch rolls, and in a preferred arrangement, an air nozzle projects into the tube at the end of the pinch rolls with a cutting blade mounted on the nozzle continuously slitting the tube, with the flow of air into the tube controlled to control the pressure within the bubble and therefore the cross grain orientation of the plastic film.

Other objects, advantages and features will become more apparent with the teaching of the principles of the invention in connection with the disclosure of the preferred embodiment thereof in the specification, claims and drawings, in which:

FIGURE 1 is a schematic elevational showing of a portion of mechanism for extruding tubular film constructed and operating in accordance with the principles of the present invention;

FIGURE 2 is a schematic vertical sectional view taken substantially along line II—II of FIGURE 1;

FIGURE 3 is a fragmentary sectional view taken substantially along line III—III of FIGURE 2, and FIGURE 4 is a fragmentary sectional view showing an alternate arrangement.

On the drawings:

Thermoplastic material such as polyethylene is heated and worked to form an extrudate in the formative plastic state in an extruder 10 which delivers the extrudate to a die 11 having a suitable annular opening. The die and extruder are of the type which will be fully appreciated by those versed in the art and need not be described in detail. A length of tubular film 12 continually emerges from the die 11 and tapers outwardly to form a bubble 13. As is known, the tubular film 12 will expand biaxially due to the pressure of a gaseous cooling inflating medium forming the bubble 13. Cooling of the film may be accomplished by the ambient air and by an annular air ring embodied in the member 11 blowing downwardly along the surface of the film. The plastic will form a frost line at the lower end of the conical portion and the bubble will retain a substantially uniform diameter as it moves toward a pair of pinch rolls 15 and 16.

The pinch rolls are rotated to draw the tubular film from the die and collapse the bubble forming a flattened layer of plastic sheeting 19 which is fed to delivery rolls, not shown.

Just following or substantially at the pinch rolls 15 and 16 the tube is slit at its edge by a knife 22 having a cutting edge facing toward the advancing tube and continuously slitting the tube. This converts the tube into a doubled sheet.

Extending upwardly into the interior of the bubble 13 at the end of the rolls 16 and 15 and communicating with the interior of the bubble is a means for inserting the gaseous medium into the bubble, in the form of an air nozzle or line 20. The air line is supplied with air at a substantially constant temperature from a suitable supply line 21a and the rate of flow of air and air pressure through the line is regulated by an air valve 21. Thus the conditions of the air within the bubble as to temperature and pressure are retained substantially constant. Some of the air after circulating through the bubble escapes alongside the air line 20. The line 20 extends axially into the bubble being aligned with the nip between the rolls. The line 20 is shaped so that it has an extension or nozzle opening 23 extending up into the tube to insure that the air flows up into the bubble. Means for adjusting the vertical position of the knife 22, and nozzle 23 as shown schematically by the double arrowed line 24 may be provided.

A pair of guide rollers 25 may be located ahead of the pinch rolls 15 and 16 at the edge of the bubble 13 opposite the location of the nozzle 23. Only one roller 25 is shown, for convenience of illustration but two are provided, one on each side of the bubble, in opposed relationship to slightly flatten the bubble.

The nozzle may be turned inwardly as shown at 23a in FIGURE 4 so that air discharge is nearer the center of the bubble rather than adjacent the film wall.

Thus it will be seen that I have provided an improved method and mechanism which meets the objectives and advantages above set forth for controlling the biaxial orientation of film by regulating the conditions of the air or other gaseous medium which is injected into the film bubble. The mechanism is relatively simple in construction and reliable in operation and is capable of continuous operation in a film manufacturing process without frequent attention or repair.

Control of the size of the bubble in the film is regulated by varying the rate of flow of air into the bubble by the valve. The cooling rate is also variable by the temperature of the delivered air.

The drawings and specification present a detailed disclosure of the preferred embodiments of the invention,

I claim as my invention:

1. The method of making thin sheet film which comprises extruding plastic material continuously from an extruding head forming a tube, flattening the tube across the width thereof at a flattening location spaced from the extruding head and leaving an edge portion unflattened, inflating the tube with an inflating member through said edge portion for forming a bubble between the inflating head and flattening location, and slitting the edge of the tube at said edge portion and separating the flattened tube to accommodate insertion of the inflating member.

2. A mechanism for extruding tubular plastic film comprising, an extrusion die for extruding film in tubular form,
means for delivering extrudate to said die, a pair of rotatable pinch rolls spaced from said die for drawing the tubular film from the die with a bubble being formed between the die and rolls, said rolls positioned relative to the die so that an edge portion of the film extends beyond the ends of the rolls,
knife means positioned at the ends of the pinch rolls at said edge portion of the film continuously slitting the film,
an air conduit extending into the slit film positioned to discharge air through said edge portion past said pinch rolls into said bubble for inflating the bubble and biaxially orienting the film, and
means in said air conduit controlling the rate of flow of air into the film bubble for controlling the degree of biaxial orientation.

3. A mechanism for extruding tubular plastic film comprising, an extrusion die for extruding film in tubular form,
means for delivering extrudate to said die,
a pair of rotatable pinch rolls spaced from said die for drawing the tubular film from the die with a bubble being formed between the die and rolls, and positioned relative to the die so that an edge portion of the film extends beyond the roll ends,
an air tube projecting axially into the tube at said edge portion being positioned opposite the roll ends and aligned with the nip between the pinch rolls, and a cutting blade mounted on the tube and slitting the oncoming tube.

4. A mechanism for extruding tubular plastic film comprising, an extrusion die for extruding film in tubular form,
means for delivering extrudate to said die,
a pair of rotatable pinch rolls spaced from said die for drawing the tubular film from the die with a bubble being formed between the die and rolls, said rolls positioned relative to the die so that an edge portion of the film is located past the ends of the rolls,
knife means positioned at the end of the pinch rolls at said edge portion of the film bubble continuously slitting the film,
means for adjustably locating the position of said knife means relative to the pinch rolls,
and means communicating with the interior of the bubble through said edge portion for directing inflating air into the interior thereof and biaxially orienting the film.

5. A mechanism for extruding tubular plastic film comprising, an extrusion die for extruding film in tubular form,
means for delivering extrudate to said die,
a pair of rotatable pinch rolls spaced from said die and having a nip therebetween for drawing the tubular film from the die with a bubble being formed between the die and rolls, said rolls positioned relative to the die so that a portion of the film is beyond the end of the nip and not pinched between the rolls,
fluid delivery means communicating with the interior of the tubular film through said edge portion for inflating the tube to form the bubble and biaxially orient the film,
and means axially slitting the tube at said edge portion with said fluid delivery means extending through the slit in the film.

6. A mechanism for extruding tubular plastic film in accordance with claim 5 wherein the fluid delivery means is in the form of a tube extending through said edge portion parallel to the direction of movement of the film and the discharge end of the tube opens laterally in the bubble transversely of the axis thereof.

7. A mechanism for extruding tubular plastic film in accordance with claim 5 wherein means are provided for flattening the bubble ahead of the pinch rolls at the side of the film opposite said edge portion.

References Cited by the Examiner

UNITED STATES PATENTS

| | | | |
|---|---|---|---|
| 2,750,631 | 6/1956 | Johnson | 264—95 |
| 2,832,994 | 5/1958 | Ahlich et al. | 264—95 X |
| 2,862,234 | 12/1958 | Gerber | 264—95 |
| 2,923,194 | 2/1960 | Ambler et al. | |
| 2,987,767 | 6/1961 | Berry et al. | 264—95 |
| 3,092,874 | 6/1963 | Fallwell | 264—95 X |
| 3,121,761 | 2/1964 | Osborn | 264—95 |
| 3,166,616 | 1/1965 | Bild et al. | 18—145 X |
| 3,170,011 | 2/1965 | Cheney et al. | 264—95 |
| 3,193,547 | 7/1965 | Schott | 264—95 X |

ROBERT F. WHITE, *Primary Examiner.*

L. S. SQUIRES, *Assistant Examiner.*